3,155,286
FEEDER
Marvin D. Van Peursem, New Holland, Pa., assignor to Sperry Rand Corporation, New Holland, Pa., a corporation of Delaware
Filed July 26, 1963, Ser. No. 297,846
4 Claims. (Cl. 222—166)

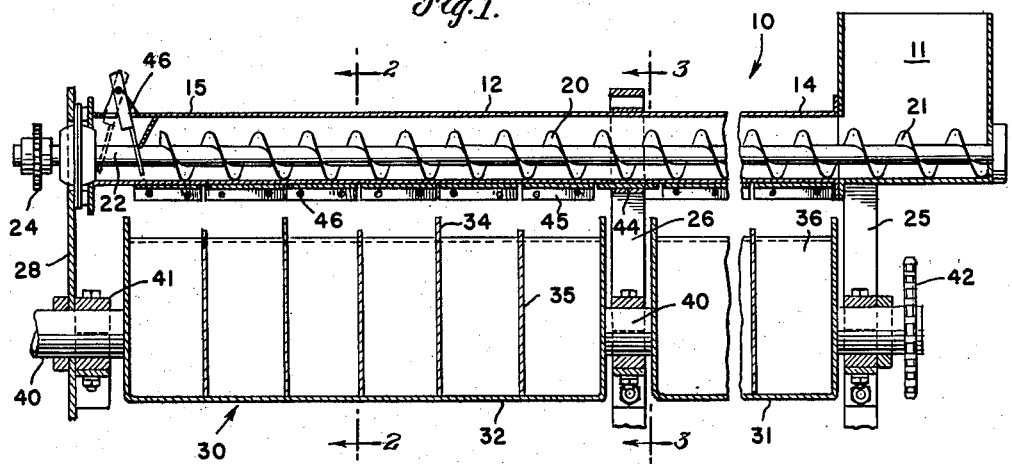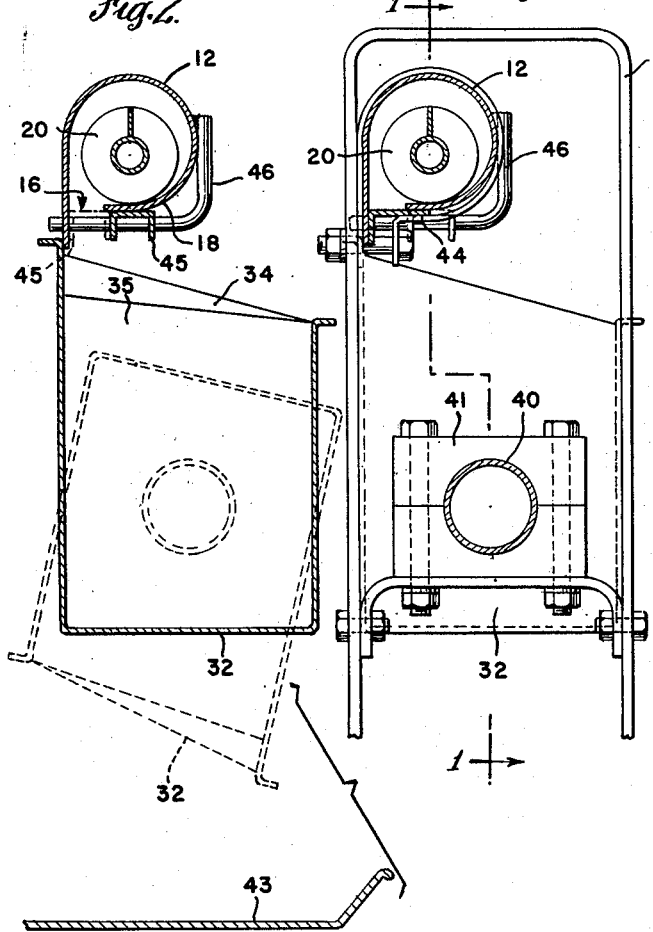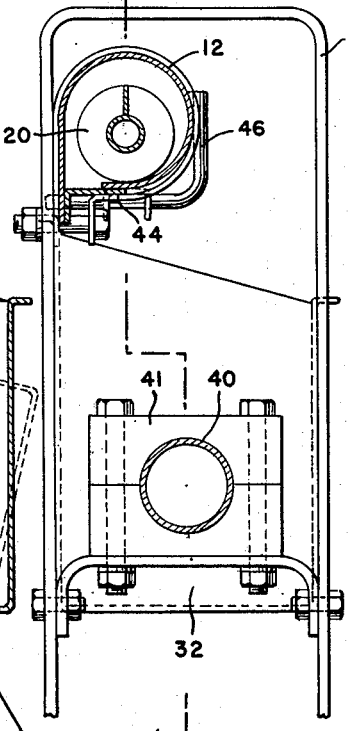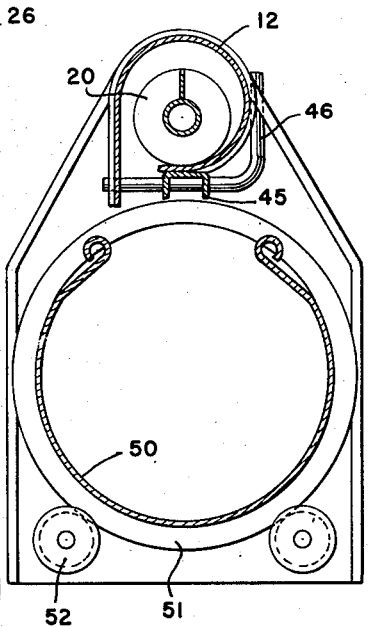

This invention relates generally to devices for feeding stock animals. More specifically, the invention relates to a device particularly adaptable for feeding hogs in pens.

A hog farmer will frequently have pens located one after another, with each pen housing a given number of hogs. The hogs in one pen may be of a breed and age different from the hogs in an adjacent pen. In such case, it may be desirable to have the quantity of feed deposited into one pen different from the amount of feed deposited in another pen. Also, the hogs in a given pen may be marketed, in which case that particular pen should receive no feed until other hogs have been provided.

At present, stock feeders are available which will deliver and deposit feed along a feeder trough. However, presently available feeders have only limited utility in supplying feed for hogs in pens and they are unsuited for varying the amount of feed deposited in each pen.

One object of this invention is to provide a stock feeder whereby feed may be delivered simultaneously to a plurality of pens and a pre-selected quantity of feed deposited in each pen.

Another object of this invention is to provide a stock feeder whereby the amount of feed deposited in one pen may be different from the amount of feed deposited in another pen.

Another object of this invention is to provide a stock feeder of the character described which is of such design that a small size feed conveyor may be employed with a light drive and a small motor.

A further object of this invention is to provide a stock feeder of such design and operation that no metering means is required to deliver feed to the feed mechanism.

A still further object of this invention is to provide a stock feeder particularly adapted for feeding hogs and of an inexpensive design whereby it may be manufactured and sold at low cost.

Other objects of this invention will be apparent hereinafter from the specification and from the recital in the appended claims.

In the drawing:

FIG. 1 is a longitudinal vertical section of a stock feeder constructed according to this invention and taken generally on the lines 1—1 of FIG. 3 looking in the direction of the arrows;

FIG. 2 is a transverse vertical section taken on the line 2—2 of FIG. 1 looking in the direction of the arrows;

FIG. 3 is a transverse vertical section taken on the line 3—3 of FIG. 1 looking in the direction of the arrows; and FIG. 4 is a transverse vertical section of a stock feeder constructed according to another embodiment of this invention.

Referring now to the drawing by numerals of reference, and particularly to FIG. 1, 10 denotes generally a stock feeder which comprises a hopper 11 in which a supply of feed is placed for distribution. Extending horizontally is a feed container 12 having an inlet end 14 communicating with hopper 11 and a terminal end 15 remote from the hopper. Container 12 is generally cylindrical in configuration and it is provided with a substantially continuous longitudinal discharge slot 16 in a bottom portion 18 of the container.

For withdrawing feed from the hopper 11 and for conveying the feed longitudinally through container 12, an auger 20 is provided having an end 21 which projects into and extends along the bottom of hopper 11. Auger 21 has a terminal end 22 which projects beyond the end 15 of container 12 and is provided with a drive sprocket 24 to receive power for rotating the auger.

Hopper 11 and container 12 are carried on a frame structure including supports 25, 26 and 28 longitudinally spaced from each other. Mounted on these supports beneath container 12 and in register with the discharge slot 16 is a receptacle 30 comprising a plurality of compartments 31 and 32 as shown in FIG. 1. Preferably container 12 is made up of 10 foot sections and there is one compartment for each container section. Each compartment is provided with transverse, vertically extending walls 34 to divide the compartment into sections and each section is divided into sub-sections by additional walls 35.

When auger 20 is rotated, feed is first discharged from the end of slot 16 adjacent hopper 11. The sub-section 36 of compartment 31 which is located adjacent the hopper is the first to receive material. The material builds up and fills the compartment section until the material engages the bottom of container 12 and slot 16 is closed off. Then auger 20 conveys material longitudinally to fill the next sub-section and so on until all the compartments are filled throughout the full length of the device.

Each compartment of receptacle 30 is mounted by shaft sections 40 for rotation in bearings 41 fixedly carried on the frame support structure. A sprocket 42 is provided through which rotatable power may be provided to rotate the compartment receptacles from the upright position shown in solid lines in FIG. 2 to the dump position shown in dotted lines in the figure. The compartments are fixedly connected to each other so that when one compartment dumps they all dump. The material is dropped downwardly into a feed trough 43 (FIG. 2) from which the animals feed. Thereafter, it is intended that the compartments be returned to their starting upright position to receive another supply of feed. The rotation of the compartment receptacles in one direction and then the other through sprocket 42 may be provided by any suitable source not shown.

If the slot 16 is open throughout its entire length except for the closed off portions 44 at each frame support, one compartment then the next will be filled throughout the length of the device. However, to selectively control the deposit of feed for any given compartment, the bottom of container 12 is provided with transversely slidable valve plates 45 movable from the open solid line position to the dotted closed position as shown in FIG. 2. Preferably, there is one valve plate for each sub-section of each compartment. The valve plates may be mounted by any suitable means such as L-shaped tubular rods 46 extending beneath container 12 and connected thereto. If all of the valves 45 above a given compartment are closed, then that compartment will receive no feed when the auger 20 is operated. If some of the valves are left open and other closed, then some of the sections and sub-sections beneath the feed container will receive feed and others will not. As a result, feed may be supplied to each compartment in desired quantities or wholly eliminated from a given compartment as desired.

When a desired feed arrangement has been provided by opening or closing selected valves 45, then the auger 20 may be operated to deposit feed in the containers according to the pre-selected condition. Each compartment will be successively filled until the feed reaches the end of the device. If desired, a pressure switch 46 may be provided to then shut off the auger and institute the dump of the compartments of receptacle 30. When the dump takes place, desired amounts of feed will be deposited along the length of the device. By relating the various compartments to given pen structures, the amount of feed or lack of it for any given pen may be controlled as desired.

The container 12 and auger 20 may be of relatively small light construction since the auger is relagated merely to the task of conveying and supplying feed to the compartments beneath it. The overall mechanism is relatively inexpensive to manufacture, assembly and low in cost to the ultimate user. The structure has great versatility and desired amounts of feed can be provided to hogs in spaced pens.

Instead of mounting receptacle 30 for relation on shafts 40, a semi-cylindrical dump tube 50 may be provided as shown in FIG. 4. Such tube may have a flange 51 at each end and supported on rollers 52 whereby the tube may be rotated about its longitudinal axes. Otherwise, the structure shown in FIG. 4 may be the same as that previously described.

While this invention has been described in connection with two embodiments thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A feeder for stock animals comprising, in combination, a support frame, an elongated rectilinear container mounted on said frame, said container extending in a horizontal direction and having a longitudinal discharge slot along a major portion of the length of a bottom section of the container, an elongated receptacle mounted beneath said container in register with said slot to receive feed therefrom, a plurality of compartments in said receptacle and located one after another in the direction of the container extension, means in said container for conveying feed longitudinally from one end and toward the other end of the container, said feed discharging first through the end of said slot at said container one end and filling a first receptacle compartment beneath it, the feed building up in the first compartment to close off the portion of the slot above it and then being moved along by said conveying means to fill the next compartment, a plurality of valves movably mounted relative to said container, each valve being shiftable to open and close a given portion of said slot whereby selected compartments may be closed off and prevented from receiving feed, and means for discharging feed from said receptacle.

2. A feeder for stock animals comprising, in combination, a support frame, an elongated rectilinear container mounted on said frame, said container extending in a horizontal direction and having a longitudinal discharge slot along a major portion of the length of a bottom section of the container, an elongated receptacle mounted beneath said container in register with said slot to receive feed therefrom, a plurality of compartments in said receptacle and located one after another in the direction of the container extension, means in said container for conveying feed longitudinally from one end and toward the other end of the container, said feed discharging first through the end of said slot at said container one end and filling a first receptacle compartment beneath it, the feed building up in the first compartment to close off the portion of the slot above it and then being moved along by said conveying means to fill the next compartment, a plurality of valves movably mounted relative to said container, each valve being shiftable to open and close a given portion of said slot whereby selected compartments may be closed off and prevented from receiving feed, and means supporting said receptacle for rotation about its longitudinal axis to discharge feed therefrom and all compartments which have received feed being adapted to dump feed at the same time.

3. A feeder for stock animals as recited in claim 2 wherein each compartment is divided in longitudinally spaced sections, there being a container slot valve for each section whereby particular sections of each receptacle compartment may be closed off.

4. A feeder for stock animals as recited in claim 2 wherein means is provided on said frame mounting said valves for movement in a direction transverse to the extension of the container.

References Cited by the Examiner
UNITED STATES PATENTS

| | | | |
|---|---|---|---|
| 1,076,776 | 10/13 | Matthews et al. | 141—239 |
| 3,123,050 | 3/64 | Haen | 119—52 |

SAMUEL KOREN, *Primary Examiner.*

HUGH R. CHAMBLEE, *Examiner.*